United States Patent
Yu et al.

(10) Patent No.: US 10,264,540 B2
(45) Date of Patent: Apr. 16, 2019

(54) ACTIVE LOAD MODULATION TECHNIQUE IN NEAR FIELD COMMUNICATION

(71) Applicant: HUAWEI INTERNATIONAL PTE. LTD., Singapore (SG)

(72) Inventors: Rui Yu, Singapore (SG); Xuesong Chen, Singapore (SG); Theng Tee Yeo, Singapore (SG); Lee Guek Doreen Yeo, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 0 days.

(21) Appl. No.: 15/726,011

(22) Filed: Oct. 5, 2017

(65) Prior Publication Data

US 2018/0110018 A1 Apr. 19, 2018

(30) Foreign Application Priority Data

Oct. 7, 2016 (SG) .......................... 10201608437W

(51) Int. Cl.
*H04B 5/00* (2006.01)
*H04W 56/00* (2009.01)
(Continued)

(52) U.S. Cl.
CPC ........ *H04W 56/001* (2013.01); *H04B 5/0031* (2013.01); *H04B 5/0062* (2013.01);
(Continued)

(58) Field of Classification Search
CPC ....... H04W 56/001; H04B 5/0062; H04L 7/04
(Continued)

(56) References Cited

U.S. PATENT DOCUMENTS

| | | | |
|---|---|---|---|
| 2012/0071089 A1* | 3/2012 | Charrat ............. | G06K 19/0723 455/41.1 |
| 2013/0321230 A1 | 12/2013 | Merlin et al. | |
| 2014/0003548 A1* | 1/2014 | Lefley ................ | H04B 5/0075 375/268 |

FOREIGN PATENT DOCUMENTS

| | | |
|---|---|---|
| CN | 103269220 A | 8/2013 |
| SG | 10201509972 Y | 9/2016 |

(Continued)

OTHER PUBLICATIONS

Finkenzeller et al., "Battery powered tags for ISO/IEC 14443, actively emulating load modulation," Proceedings of RFID SysTech, XP055311620, ITG-Fachbericht 229, Dresden, Germany (2011).

*Primary Examiner* — Ayodeji O Ayotunde
(74) *Attorney, Agent, or Firm* — Leydig, Voit & Mayer, Ltd.

(57) ABSTRACT

A near field communication (NFC) device configured to use in preparing a carrier signal for active load modulation supporting both synchronous and asynchronous transmissions. The NFC device comprises a local clock generator for generating a reference clock signal (REF_CLK), a clock extractor for recovering a clock signal (EXT_CLK) generated by an NFC initiator device, a frequency tracking module (FTM) for performing a frequency tracking operation based on an input clock signal (REF_CLK or EXT_CLK) to produce a FTM output with its frequency aligned with the input clock signal, and a phase tracking module (PTM) for performing a phase tracking operation on the FTM output based on EXT_CLK to produce a PTM output with its phase aligned with EXT_CLK.

23 Claims, 9 Drawing Sheets

(51) Int. Cl.
  *H04L 7/04* (2006.01)
  *H04L 7/033* (2006.01)

(52) U.S. Cl.
  CPC ............ *H04B 5/0081* (2013.01); *H04L 7/04* (2013.01); *H04W 56/0035* (2013.01); *H04L 7/0337* (2013.01)

(58) Field of Classification Search
  USPC ........................................................ 455/41.1
  See application file for complete search history.

(56) References Cited

FOREIGN PATENT DOCUMENTS

| | | |
|---|---|---|
| WO | 2016081131 A1 | 5/2016 |
| WO | 2017095328 A1 | 6/2017 |

\* cited by examiner

ACTIVE LOAD MODULATION TECHNIQUE IN NEAR FIELD COMMUNICATION

CROSS-REFERENCE TO RELATED APPLICATIONS

This application claims priority to Singapore Patent Application No. 10201608437W, filed on Oct. 7, 2016, which is hereby incorporated by reference in its entirety.

FIELD OF THE INVENTION

This invention relates to load modulation technique in near field communication (NFC). More particularly, this invention relates to active load modulation (ALM) in NFC with synchronous and synchronous transmissions. Still more particularly, this invention relates to NFC device and method for preparing a carrier signal with properly aligned phase and frequency for ALM transmission.

BACKGROUND OF THE INVENTION

In the past decade, contactless technology has been used extensively in card payment industry, such as debit cards, credit cards and charge cards. More recently, contactless technology has been extended to mobile phones that emulate contactless cards, enabling users to replace multiple cards with a single device. Accordingly, near field communication (NFC) technology has been introduced to support this application. Mobile phones and SIM cards that can store and run various software applications make a powerful platform to be utilized together with NFC. NFC is in fact a branch of radio frequency identification (RFID) operates at high frequency of 13.56 MHz and offers data transmission rate from 106 to 424 kbps within a short distance of few centimeters (typically up to 10 cm). The standards and protocols of NFC are outlined in ISO/IEC 14443, 18092, 15693, JIS X 6319-4, etc.

An NFC device can be an NFC initiator (or reader) as well as an NFC target (or tag), and may operate in different modes, namely, read/write mode, peer-to-peer mode, and card emulation mode. An NFC target is only activated when it is within the response range of an NFC initiator. NFC technology involves an inductive coupling of the initiator's antenna and the target's antenna, measured by a coupling factor (K) (value between 0 and 1). This coupling factor depends essentially on the geometric parameters of the antennas and the distance between them. In passive load modulation (PLM), switching of a load connected to the target's antenna is performed, in which a default load corresponds to the unmodulated state and a switched load corresponds to the modulated state. When the initiator's and target's antennas are inductively coupled, the initiator can detect these load variations and decode them to extract the information.

The difference between the modulated and unmodulated voltages sensed by the initiator is the load modulation amplitude. Generally, the higher of the coupling factor, the greater will be the load modulation amplitude. If the amplitude falls below a certain minimum value, the initiator may not able to reliably sense the signal modulations. For contactless payment cards (e.g. credit card of ID-1 format), PLM can reliably produce sufficient load modulation amplitude since a relative large antenna can be embedded in the card. However, this is not the case for NFC-enabled mobile phones as the cramped form factor of mobile phones may provide space for a very tiny antenna only (thus weak coupling factor). Furthermore, the abundant of metals, circuits and radio frequency (RF) signals of mobile phones may further impair the ability of a mobile phone to couple with the initiator's antenna.

In view of the above design constraints, to improve the performance of NFC mobile phones, active load modulation (ALM) technique has been introduced. Unlike PLM which utilises power from the RF field generated by the initiator device, ALM makes use of the mobile phone's battery power supply to actively transmit the modulated signal. In ALM, a modulated signal synchronous with the initiator's carrier signal is transmitted during the modulated state, and turned off during the unmodulated state. The main benefit of ALM technique is that the same load modulation amplitude can be achieved as PLM technique, but with a much lower coupling factor. Thus, the initiator device is unable to differentiate whether PLM or ALM technique is used to transmit the data and this resulting in an identical consumer experience. Accordingly, ALM permits the use of an antenna that is much smaller than the antenna of a typical PLM system, e.g. 80 to 90% size reduction.

To extend the load modulation range with smaller antenna size, ALM technique generates a signal with the same spectral characteristics as a load modulation signal and to actively transmit this signal to the initiator. More specifically, instead of using direct load modulation, the target uses a subcarrier frequency ($f_s$) to modulate data. Various modulation schemes, such as amplitude shift keying (ASK), on/off keying (OOK), and binary phase shift keying (BPSK), and data encoding techniques, such as Manchester encoding, NRZ-L encoding, and Modified Miller encoding, may be used. When the load resistor of the target is switched on and off at a high frequency ($f_s$), two modulation sidebands are created at a distance of $\pm f_s$ from the carrier frequency (13.56 MHz) of the initiator. The subcarrier frequency, $f_s$=13.56 MHz/16=847.5 KHz (for bit rate 106 kbps), and the upper sideband is located at 14.4075 MHz and the lower sideband is located at 12.7125 MHz. The data to be transmitted is contained in the modulation sidebands. Thus, to transmit data from target to initiator, the target needs to generate two subcarrier signals, each of which has sidebands containing the data to be transmitted to the initiator. The amplitude of such modulated signal may be amplified by a power amplifier and then radiated to the initiator by the target's antenna.

To ensure proper ALM transmission, besides the required load modulation amplitude levels, it is also requires that the transmitted modulated signal is synchronous (in phase) with the initiator's carrier signal. But phase synchronization is hard to achieve at all time, especially during ALM transmission as the carrier signal transmitted by the initiator is obscured by the active transmitted signal from the target. Thus, during the time when the target is actively transmits its data, the initiator's carrier signal is not directly observable. As such, the phase/frequency of the initiator's carrier signal may not be recovered faithfully by the target. This may result in a not synchronous target response and thus a phase drifting signal received by the initiator. Phase synchronization becomes even harder for asynchronous transmission as the target uses a local oscillator to generate a local reference clock which is independent from the initiator's oscillator.

One possible solution for phase synchronization is proposed in the U.S. patent application Ser. No. 13/482,930. In this method, the antenna of an NFC device is split into two loops for transmit (Tx) and receive (Rx), with a common ground. Ideally, the coupling between the Rx and Tx loops is zero, allowing the NFC device in target mode to receive and synchronize with the carrier's phase of the NFC device working in R/W mode even during transmission. However, study shows that a zero coupling between the two loops can hardly be ensured in practical implementation. Furthermore, due to its complexity and high fabrication cost, such an antenna with two loops is not favourable.

In light of the above, those skilled in the art are striving to improve the phase synchronization technique in order to prepare a synchronous carrier signal for ALM transmission.

SUMMARY OF THE INVENTION

The above and other problems are solved and an advance in the art is made by provision of an NFC device and method for preparing a carrier signal for active load modulation (ALM) transmission in accordance with embodiments of this invention. A first advantage of this invention is that a dual loop structure comprised of a frequency tracking loop and a phase tracking loop is employed to efficiently prepare a carrier signal for ALM that supports both synchronous transmission (based on a recovered clock signal—extracted from the carrier signal generated by the initiator device) and asynchronous transmission (based on a locally generated reference clock signal).

A second advantage of this invention is that, for asynchronous transmission, a desired carrier frequency for ALM can be efficiently synthesized by the frequency tracking loop based on a reference clock signal generated by a local clock generator within the target device itself, thereby avoiding using the clock signal recovered from the carrier signal generated by the initiator device.

A third advantage of this invention, in relation to the second advantage above, is that, for asynchronous transmission, the frequency tracking module can operate continuously in a closed loop to synthesis a desired carrier frequency even during ALM transmission, thereby avoiding possible disturbances (e.g. frequency drifting) due to open/close loop transitions.

A fourth advantage of this invention is that, for asynchronous transmission, it can produce a carrier signal with its phase quickly aligned with the recovered clock signal even when its frequency is not exactly the same as that of the initiator's frequency but close to 13.56 MHz (maximum offset of ±7 KHz).

A fifth advantage of this invention is that, for synchronous transmission, the frequency tracking loop is required to open only in the first half of the subcarrier period during ALM transmission (not the entire ALM transmission period as required in the common PLL systems), thus phase offset of the carrier signal can be constantly be corrected.

A sixth advantage of this invention in accordance to some embodiments is that, the phase tracking loop is capable of aligning the clock phase of the carrier signal with the recovered clock signal in a relative fast speed due to the parallel digital processing mechanism adopted in the phase tracking loop.

In accordance with embodiments of this invention, a near field communication (NFC) device for use in preparing a carrier signal for active load modulation transmission is provided. The NFC device comprises a local clock generator configured to generate a reference clock signal; a clock extractor configured to recover a clock signal generated by an NFC initiator device; a frequency tracking module (FTM) configured to perform a frequency tracking operation based on an input clock signal to produce a FTM output with its frequency aligned with the input clock signal wherein the input clock signal is the reference clock signal or the recovered clock signal; and a phase tracking module (PTM) configured to perform a phase tracking operation on the FTM output based on the recovered clock signal to produce a PTM output with its phase aligned with the recovered clock signal. The PTM output at a desired frequency and phase is served as the carrier signal for use in load modulating data of the NFC device to form a load modulated signal to be actively transmitted to the NFC initiator device.

In accordance with embodiments of this invention, the FTM comprises a phase-frequency detector (PFD), a loop filter (LF), a voltage controlled oscillator (VCO), and a frequency divider (FD) connected sequentially to form an analog phase-locked loop (PLL) system to perform the frequency tracking operation to synthesis a desired frequency based on the input clock signal. The PFD comprises a circuitry configured to receive the input clock signal and a feedback signal from the FD, compare phase and/or frequency of the feedback signal with the input clock signal, and produce a control signal in response to an offset in phase and/or frequency between the feedback signal and the input clock signal. The LF comprises a circuitry configured to receive the control signal from the PFD, perform a filtering operation on the control signal, and produce a control value associated to the offset in phase and/or frequency between the feedback signal and the input clock signal. The VCO comprises a circuitry configured to receive the control value from the LF and produce a VCO output with its phase and/or frequency adjusted based on the control value wherein the VCO output is served as the FTM output. The FD comprises a circuitry configured to receive the VCO output from the VCO, divide frequency of the VCO output by a number which is changeable to any suitable value to alter frequency of the VCO output to be equal or closer to frequency of the input clock signal, and produce a feedback signal to be fed into the PFD. The feedback signal is aligned with the input clock signal when the feedback signal and the input clock signal are in-phase and their frequencies are equal or close to each other within an acceptable frequency accuracy.

In accordance with embodiments of this invention, the FTM comprises a time-to-digital converter (TDC), a digital loop filter (DLF), a digitally controlled oscillator (DCO), and a frequency divider (FD) connected sequentially to form an all-digital phase-locked loop (PLL) system to perform the frequency tracking operation to synthesis a desired frequency based on the input clock signal. The TDC comprises a circuitry configured to receive the input clock signal and a feedback signal from the FD, compare phase of the feedback signal with the input clock signal, and produce a digital signal in response to a phase offset between the feedback signal and the input clock signal. The DLF comprises a circuitry configured to receive the digital signal from the TDC, perform a filtering operation on the received digital signal, and produce a digital control signal associated to the phase offset between the feedback signal and the input clock signal. The DCO comprises a circuitry configured to receive the digital control signal from the DLF and produce a DCO output with its phase adjusted based on the digital control signal wherein the DCO output is served as the FTM output. The FD comprises a circuitry configured to receive the DCO output, divide frequency of the DCO output by a number which is changeable to any suitable value to alter frequency of the DCO output to be equal or closer to frequency of the input clock signal, and produce a feedback signal to be fed into the TDC. The feedback signal is aligned with the input clock signal when the feedback signal and the input clock signal are in-phase and their frequencies are equal or close to each other within an acceptable frequency accuracy.

In accordance with embodiments of this invention, the FTM further comprises a multiplexer comprises a circuitry configured to select the input clock signal which is either the reference clock signal from the local clock generator or the recovered clock signal from the clock extractor.

In accordance with embodiments of this invention, wherein the input clock signal is the reference clock signal which is independent of the clock signal generated by the initiator device, the PLL system of the FTM is able to operate continuously in a closed loop even during active load modulation transmission. In accordance with embodiments of this invention, wherein the input clock signal is the recovered clock signal which is dependent on the clock signal generated by the initiator device, the PLL system of the FTM is required to convert to an open loop during active load modulation transmission. The local clock generator is a temperature-compensated crystal oscillator.

In accordance with embodiments of this invention, the PTM comprises a phase interpolation (PI) unit, a phase sampler, and a digital loop filter (DLF) connected sequentially to form a feedback loop system to perform the phase tracking operation to track a desired clock phase based on the recovered clock signal. The phase sampler comprises a circuitry configured to receive the recovered clock signal and a PI output from the PI unit, compare phase of the recovered clock signal with the PI output, and produce a digital signal in response to a phase offset between the recovered clock signal and the PI output. The DLF comprises a circuitry configured to receive the digital signal from the phase sampler, perform a filtering operation on the digital signal, and produce a digital control signal associated to the phase offset between the recovered clock signal and the PI output. The PI unit comprises a circuitry configured to receive a first plurality of FTM outputs with equally spaced phases by a first phase difference from the FTM, interpolate the first plurality of FTM outputs to form a second plurality of FTM outputs with equally spaced phases by a second phase difference wherein the second plurality of FTM outputs is greater than the first plurality of FTM outputs, and select one of the second plurality of FTM outputs to be output from the PI unit as an PI output based on the digital control signal received from the DLF such that the PI output has the closest phase to the recovered clock signal among the second plurality of FTM outputs wherein the PI output is served as the PTM output and fed into the phase sampler. The PI output is aligned with the recovered clock signal when the PI output and the recovered clock signal are in-phase or close to each other within an acceptable phase accuracy.

In accordance with embodiments of this invention, the PTM comprises a phase interpolation (PI) unit, a time-to-digital converter (TDC), and a phase selection (PS) unit connected to form a system to perform the phase tracking operation to track a desired clock phase based on the recovered clock signal. The PI unit comprises a circuitry configured to receive a first plurality of FTM outputs with equally spaced phases by a first phase difference from the FTM, interpolate the first plurality of FTM outputs to form a second plurality of FTM outputs with equally spaced phases by a second phase difference wherein the second plurality of FTM outputs is greater than the first plurality of FTM outputs, and send the second plurality of FTM outputs to the TDC and the PS unit concurrently. The TDC comprises a circuitry configured to receive the recovered clock signal and the second plurality of FTM outputs from the PI unit, compare phase of the recovered clock signal with the second plurality of FTM outputs, and produce a digital control signal associated to phase relationship between the recovered clock signal and the second plurality of FTM outputs. The PS unit comprises a circuitry configured to receive the digital control signal from the TDC and the second plurality of FTM outputs from the PI unit, and select one of the second plurality of FTM outputs to be output from the PS unit as a PS output based on the digital control signal such that the PS output has the closest phase to the recovered clock signal among the second plurality of FTM outputs wherein the PS output is served as the PTM output. The PS output is aligned with the recovered clock signal when the PS output and the recovered clock signal are in-phase or close to each other within an acceptable phase accuracy.

In accordance with embodiments of this invention, the feedback loop system of the PTM is converted to an open loop during active load modulation transmission.

In accordance with embodiments of this invention, a method for preparing a carrier signal for active load modulation transmission by a near field communication (NFC) device is provided. The method comprises generating a reference clock signal by a local clock generator in the NFC device; recovering a clock signal generated by an NFC initiator device by a clock extractor in the NFC device; performing a frequency tracking operation based on an input clock signal by a frequency tracking module (FTM) in the NFC device to produce a FTM output with its frequency aligned with the input clock signal wherein the input clock signal is the reference clock signal or the recovered clock signal; and performing a phase tracking operation on the FTM output based on the recovered clock signal by a phase tracking module (PTM) in the NFC device to produce a PTM output with its phase aligned with the recovered clock signal. The PTM output at a desired frequency and phase is served as the carrier signal for use in load modulating data of the NFC device to form a load modulated signal to be actively transmitted to the NFC initiator device.

In accordance with embodiments of this invention, the step of performing the frequency tracking operation to synthesis a desired frequency comprises forming an analog phase-locked loop (PLL) system comprises a phase-frequency detector (PFD), a loop filter (LF), a voltage controlled oscillator (VCO), and a frequency divider (FD) in the NFC device; receiving an input clock signal which is the reference clock signal from the local clock generator or the recovered clock signal from the clock extractor; comparing phase and/or frequency of a feedback signal from the FD with the input clock signal and producing a control signal in response to an offset in phase and/or frequency between the feedback signal and the input clock signal by the PFD; performing a filtering operation on the control signal from the PFD and producing a control value associated to the offset in phase and/or frequency between the feedback signal and the input clock signal by the LF; adjusting phase and/or frequency of the VCO based on the control value from the LF and producing a VCO output with adjusted phase and/or frequency wherein the VCO output is served as the FTM output; and dividing frequency of the VCO output by a number which is changeable to any suitable value to alter frequency of the VCO output to be equal or closer to frequency of the input clock signal and producing a feedback signal to be fed into the PFD by the FD. The feedback signal is aligned with the input clock signal when the feedback signal and the input clock signal are in-phase and their frequencies are equal or close to each other within an acceptable frequency accuracy.

In accordance with embodiments of this invention, the step of performing the frequency tracking operation to synthesis a desired frequency comprises forming an all-digital phase-locked loop (PLL) system comprises a time-to-digital converter (TDC), a digital loop filter (DLF), a digitally controlled oscillator (DCO), and a frequency divider (FD) in the NFC device; receiving an input clock signal which is the reference clock signal from the local clock generator or the recovered clock signal from the clock extractor; comparing phase of a feedback signal from the FD with the input clock signal and producing a digital signal in response to a phase offset between the feedback signal and the input clock signal by the TDC, performing a filtering operation on the digital signal from the TDC and producing a digital control signal associated to the phase offset between the feedback signal and the input clock signal by the DLF; adjusting phase of the DCO based on the digital control signal from the DLF and producing a DCO output with adjusted phase wherein the DCO output is served as the FTM output; and dividing frequency of the DCO output by a number which is changeable to any suitable value to alter frequency of the DCO output to be equal or closer to frequency of the input clock signal and producing a feedback signal to be fed into the TDC by the FD. The feedback signal is aligned with the input clock signal when the feedback signal and the input clock signal are in-phase and their frequencies are equal or close to each other within an acceptable frequency accuracy.

In accordance with embodiments of this invention, the step of receiving the input clock signal comprises selecting the input clock signal through a multiplexer in the NFC device.

In accordance with embodiments of this invention, wherein the input clock signal is the reference clock signal which is independent of the clock signal generated by the initiator device, the step of forming the PLL system comprises forming a closed loop that operates continuously even during active load modulation transmission. In accordance with embodiments of this invention, wherein the input clock signal is the recovered clock signal which is dependent of the clock signal generated by the initiator device, the step of forming the PLL system comprises forming an open loop during active loop modulation transmission.

In accordance with embodiments of this invention, the step of performing the phase tracking operation to track a desired clock phase comprises forming a feedback loop system comprises a phase interpolation (PI) unit, a phase sampler, and a digital loop filter (DLF) in the NFC device; receiving a first plurality of FTM outputs with equally spaced phases by a first phase difference from the FTM and interpolating the first plurality of FTM outputs to form a second plurality of FTM outputs with equally spaced phases by a second phase difference by the PI unit wherein the second plurality of FTM outputs is greater than the first plurality of FTM outputs; selecting one of the second plurality of FTM outputs to be output from the PI unit as an PI output based on a digital control signal from the DLF such that the PI output has the closest phase to the recovered clock signal among the second plurality of FTM outputs wherein the PI output is served as the PTM output; comparing phase of the recovered clock signal with the PI output and producing a digital signal in response to a phase offset between the recovered clock signal and the PI output by the phase sampler; and performing a filtering operation on the digital signal from the phase sampler and producing a digital control signal associated to the phase offset between the recovered clock signal and the PI output by the DLF wherein the digital control signal is fed into the PI unit. The PI output is aligned with the recovered clock signal when the PI output and the recovered clock signal are in-phase or close to each other within an acceptable phase accuracy.

In accordance with embodiments of this invention, the step of performing the phase tracking operation to track a desired clock phase comprises forming a system comprises a phase interpolation (PI) unit, a time-to-digital converter (TDC), and a phase selection (PS) unit in the NFC device; receiving a first plurality of FTM outputs with equally spaced phases by a first phase difference from the FTM and interpolating the first plurality of FTM outputs to form a second plurality of FTM outputs with equally spaced phases by a second phase difference by the PI unit wherein the second plurality of FTM outputs is greater than the first plurality of FTM outputs; sending the second plurality of FTM outputs to the TDC and the PS unit concurrently; comparing phase of the recovered clock signal with the second plurality of FTM outputs received from the PI unit and producing a digital control signal associated to phase relationship between the recovered clock signal and the second plurality of FTM outputs by the TDC; and selecting one of the second plurality of FTM outputs received from the PI unit to be output from the PS unit as a PS output based on the digital control signal from the TDC such that the PS output has the closest phase to the recovered clock signal among the second plurality of FTM outputs wherein the PS output is served as the PTM output. The PS output is aligned with the recovered clock signal when the PS output and the recovered clock signal are in-phase or close to each other within an acceptable phase accuracy.

In accordance with embodiments of this invention, the step of forming the feedback loop system comprises forming an open loop during active load modulation transmission.

BRIEF DESCRIPTION OF THE DRAWINGS

The above and other features and advantages of this invention are described in the following detailed description of preferred embodiments with reference to the following figures.

DETAILED DESCRIPTION OF THE INVENTION

This invention relates to load modulation technique in near field communication (NFC). More particularly, this invention relates to active load modulation (ALM) in NFC with synchronous and synchronous transmissions. Still more particularly, this invention relates to NFC device and method for preparing a carrier signal with properly aligned phase and frequency for ALM transmission. In this application, the term "initiator/reader device" refers to an NFC-enabled device that initiates an NFC connection, such as mobile phone, point-of-sale terminal, etc. The term "target/tag device" refers to an NFC-enabled device that responds to a request from the initiator/reader device, such as mobile phone, personal digital assistance, or other mobile devices.

For ALM with synchronous transmission, a clock extractor is required to ensure proper synchronous transmission between two NFC devices. The clock extractor is within the target device and connected to the target's antenna to recover/extract clock information from the carrier signal generated by the initiator device that detected by the target's antenna. The recovered clock is used to control load modulation of target's data to be transmitted to the initiator device. Hence, the transmitted modulated signal from the target device is said to be synchronous with the initiator's carrier signal. During synchronous transmission where a recovered clock is utilised, phase offset of the transmitted signal with the initiator's carrier signal needs to be taken care of in order to ensure proper transmission.

For ALM with asynchronous transmission, a local clock generator within the target device is used to generate a reference clock at a suitable frequency for use to control load modulation of target's data to be transmitted to the initiator device. This locally generated reference clock is independent of the clock signal generated by the initiator device. Hence, the transmitted modulated signal from the target device is said to be asynchronous with the initiator's carrier signal The local clock generator may be any suitable controllable oscillators that is capable of generating a stable clock signal, such as a PLL with temperature-compensated crystal oscillator (TCXO) as its reference clock source. During asynchronous transmission where a reference clock is utilised, both phase and frequency offsets of the transmitted signal with the initiator's carrier signal need to be taken care of in order to ensure proper transmission.

Figure 2:
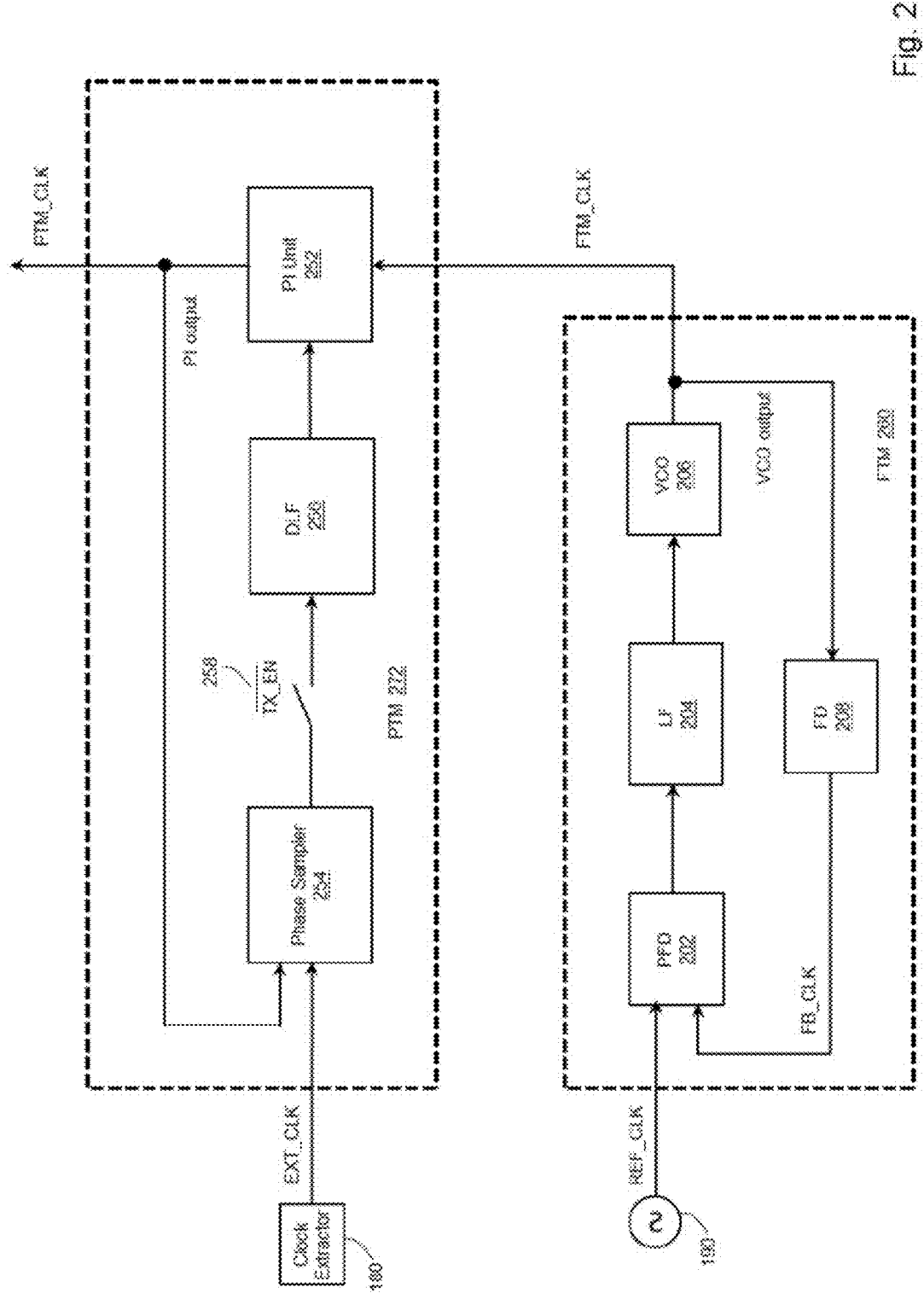
FIG. 2 illustrating a frequency tracking module (an analog phase-locked loop) and a phase tracking module (phase interpolation unit with a single phase output is utilised) of an NFC target device in accordance with an embodiment of this invention.
Figure 3:
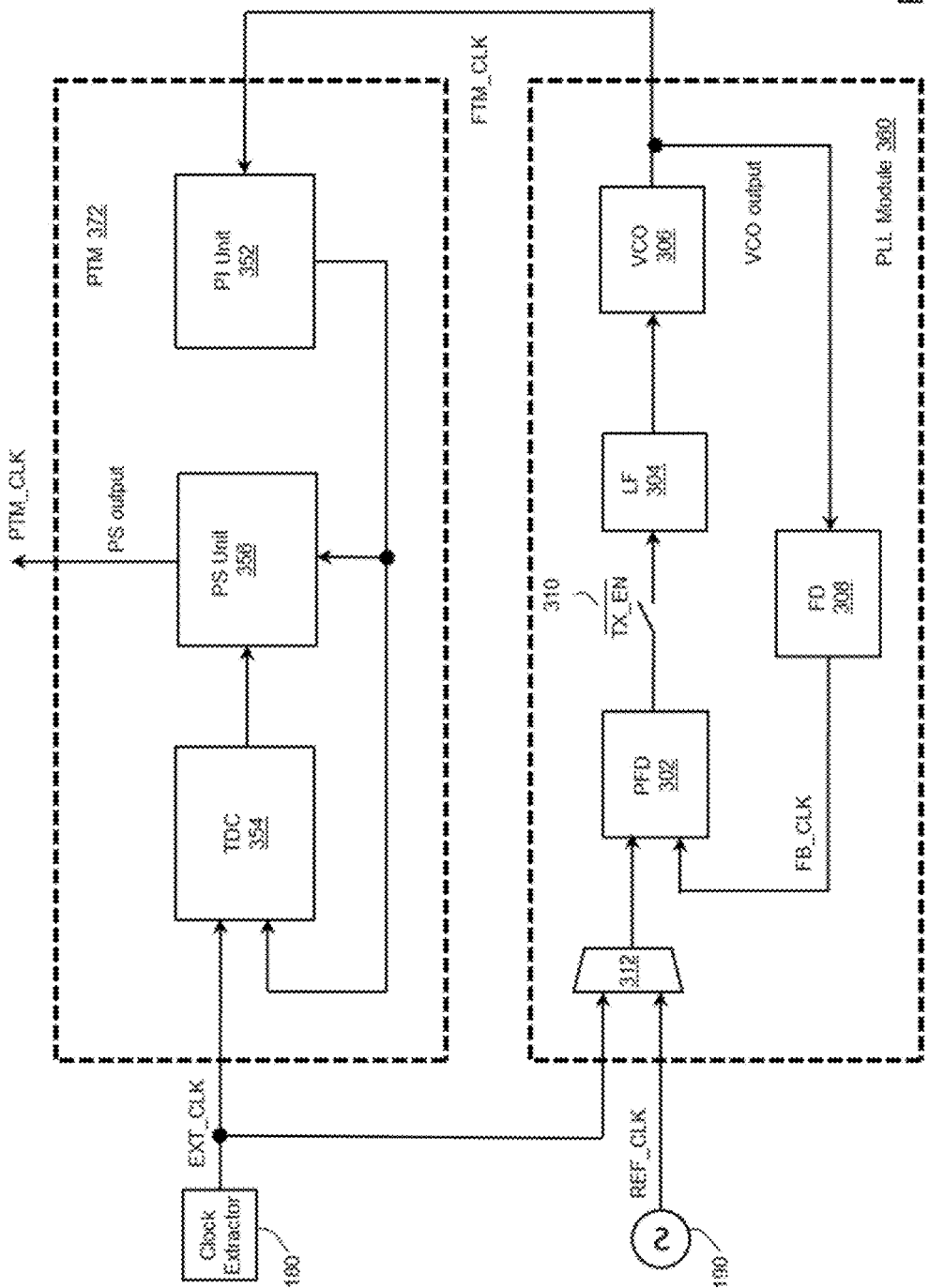
FIG. 3 illustrating a frequency tracking module (an analog phase-locked loop) and a phase tracking module (phase interpolation unit with multi-phases outputs is utilised) of an NFC target device in accordance with an embodiment of this invention.
Figure 4:
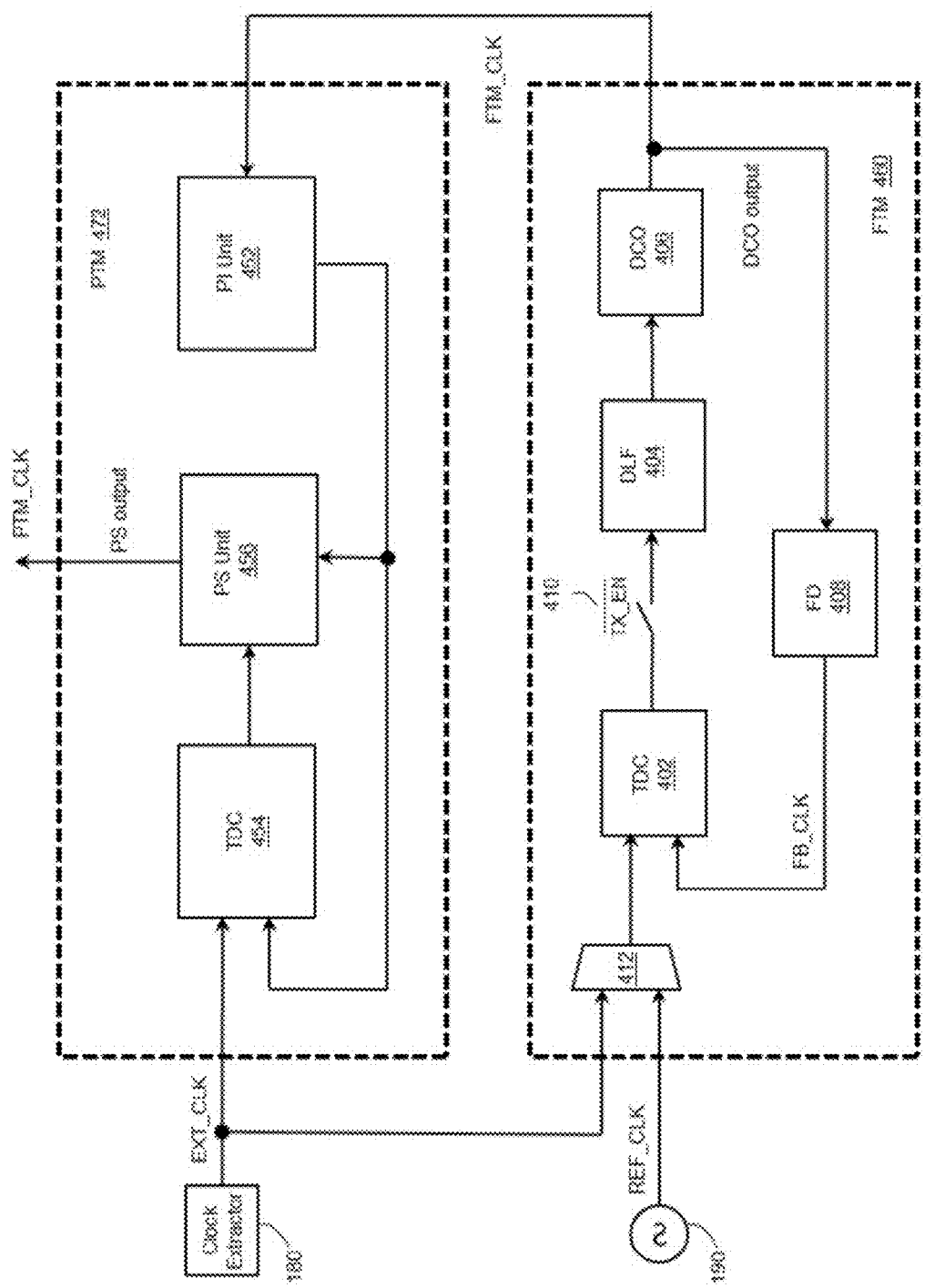
FIG. 4 illustrating a frequency tracking module (an all-digital phase-locked loop) and a phase tracking module (phase interpolation unit with multi-phases outputs is utilised) of an NFC target device in accordance with an embodiment of this invention.

In this application, two strategies are introduced to prepare a carrier signal with properly aligned phase and frequency as required by NFC standards. The first strategy (S1) is to perform phase synchronization in each data frame (suitable for a relatively short data frame transmission). An embodiment for S1 is illustrated in FIG. 2 which is for ALM with asynchronous transmission. The second strategy (S2) is to perform phase synchronization in each first half of the subcarrier period (eight clock cycles of 13.56 MHz; about 590 ns). Two embodiments for S2 are illustrated in FIGS. 3 and 4 which are for ALM supporting both synchronous and asynchronous transmissions. Generally, S2 can provide better consumer experience than S1 as S1 will take a longer time to complete data transmission than S2.

Figure 1:
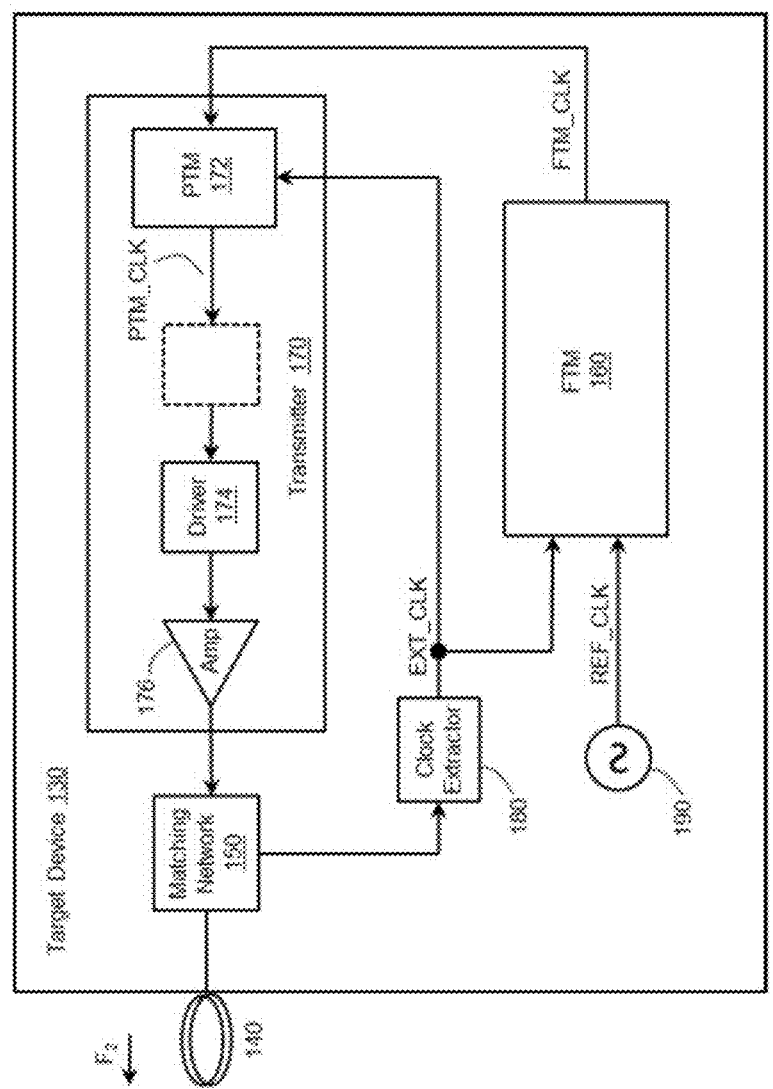
FIG. 1 illustrating an overview of an NFC system comprises an NFC initiator device and an NFC target device in accordance with an embodiment of this invention.

FIG. 1 illustrates an NFC system 100 comprises NFC initiator device 110 equipped with antenna 120 and NFC target device 130 equipped with antenna 140. Antennas 120 and 140 may be loop antennas that allow for radio frequency transmission and reception. Antennas 120 and 140 become inductively coupled when devices 110 and 130 are brought near each other (within few centimeters) so as to perform wireless communication in near field. Initiator device 110 transmits carrier signal $F_1$ (at 13.56 MHz) to target device 130. Initiator device 110 may continuously transmit $F_1$ when not transmitting data to target device 130. In response to a valid command from initiator device 110, target device 130 transmits modulated carrier signal $F_2$ to initiator device 110 (using 847.5 KHz subcarrier). Each bit period contains eight subcarrier cycles and the information transmitted in a sequence is a collection of bits included in a frame. The subcarrier will be turned off after data transmission from target device 130. $F_1$ and $F_2$ have to be aligned (in phase and frequency) for proper transmission. For synchronous transmission, target device 130 load modulates a carrier signal (based on a recovered clock signal produced by clock extractor 180) with data to be transmitted to initiator device 110. For asynchronous transmission, target device 130 load modulates a carrier signal (based on a reference clock signal generated by local clock generator 190) with data to be transmitted to initiator device 110. Initiator device 110 receives and demodulates the received $F_2$ to obtain the information transmitted by target device 130.

Figure 5A:
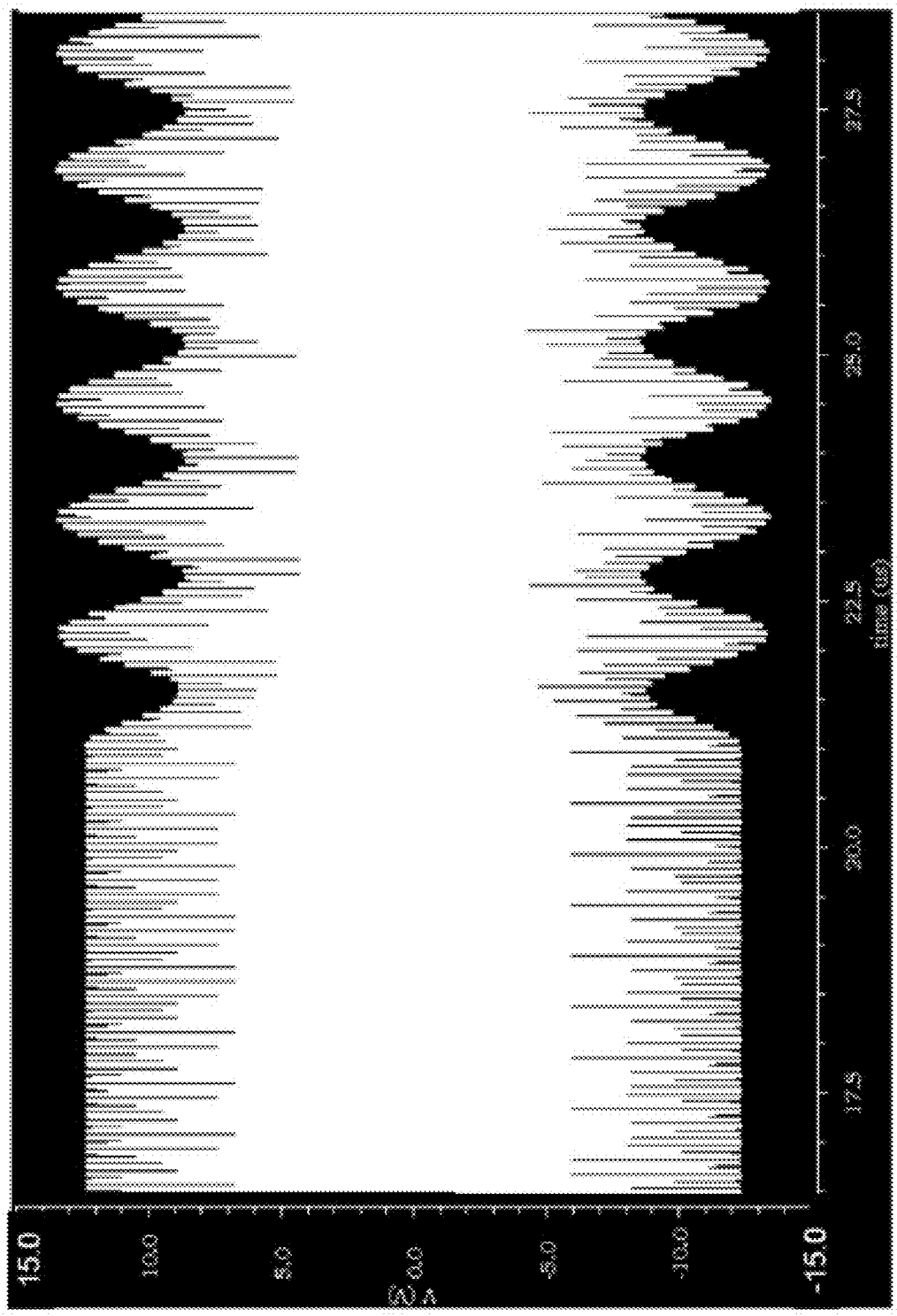
FIG. 5(A), FIG. 5(B), FIG. 5(C) and FIG. 5(D) illustrating combined waveforms of the initiator's carrier signal and the target's modulated signal depicting different phase offsets between the signals.
Figure 5B:
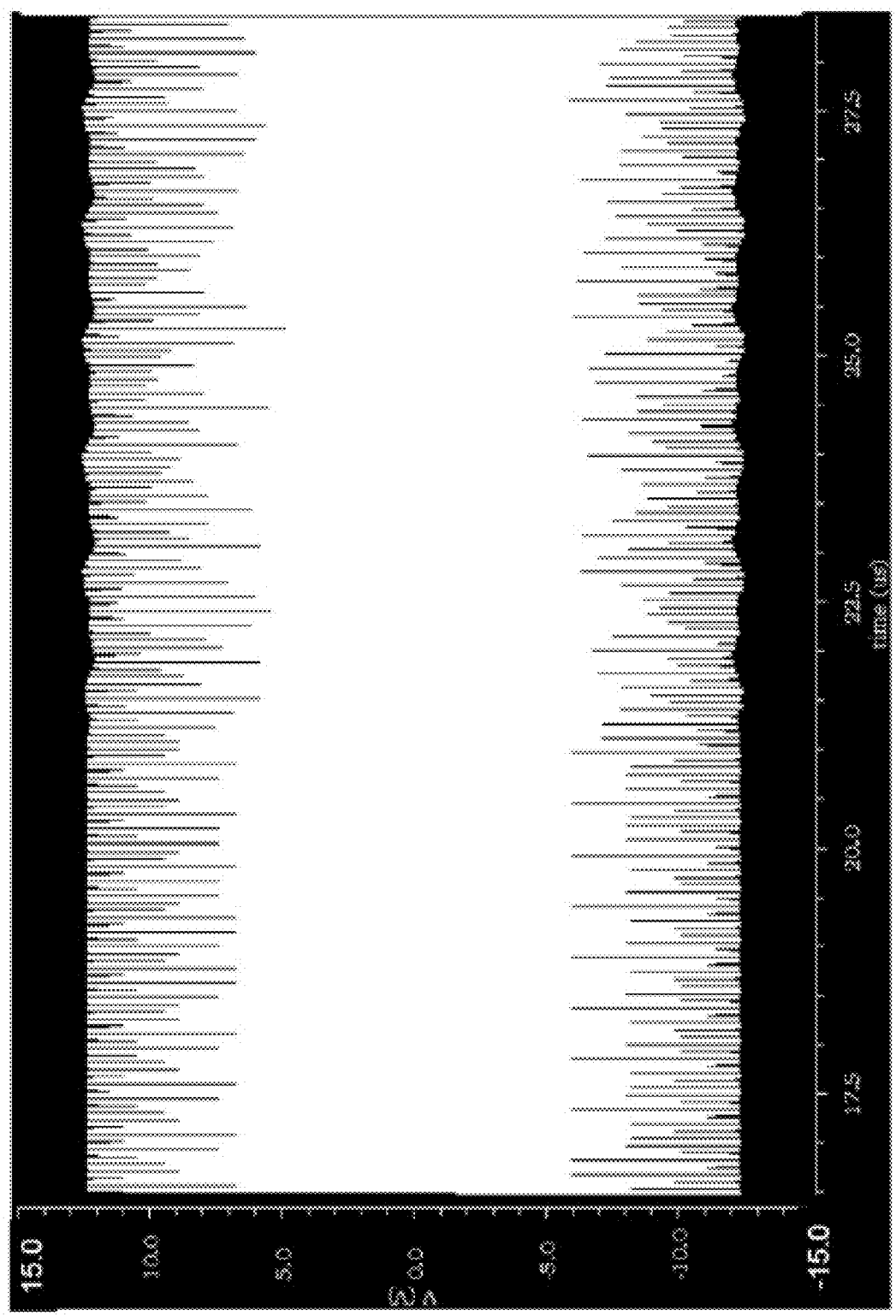
Figure 5C:
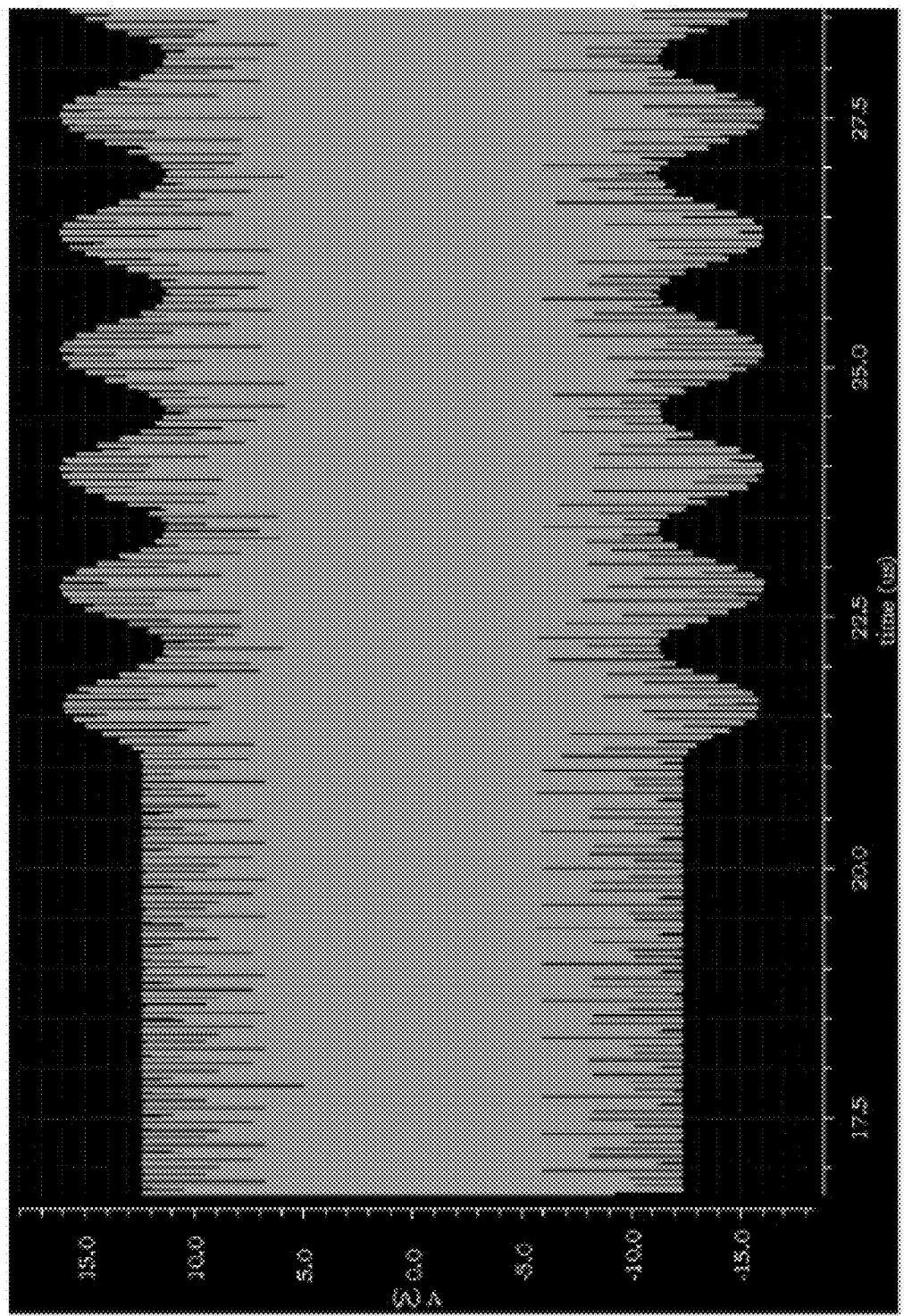
Figure 5D:
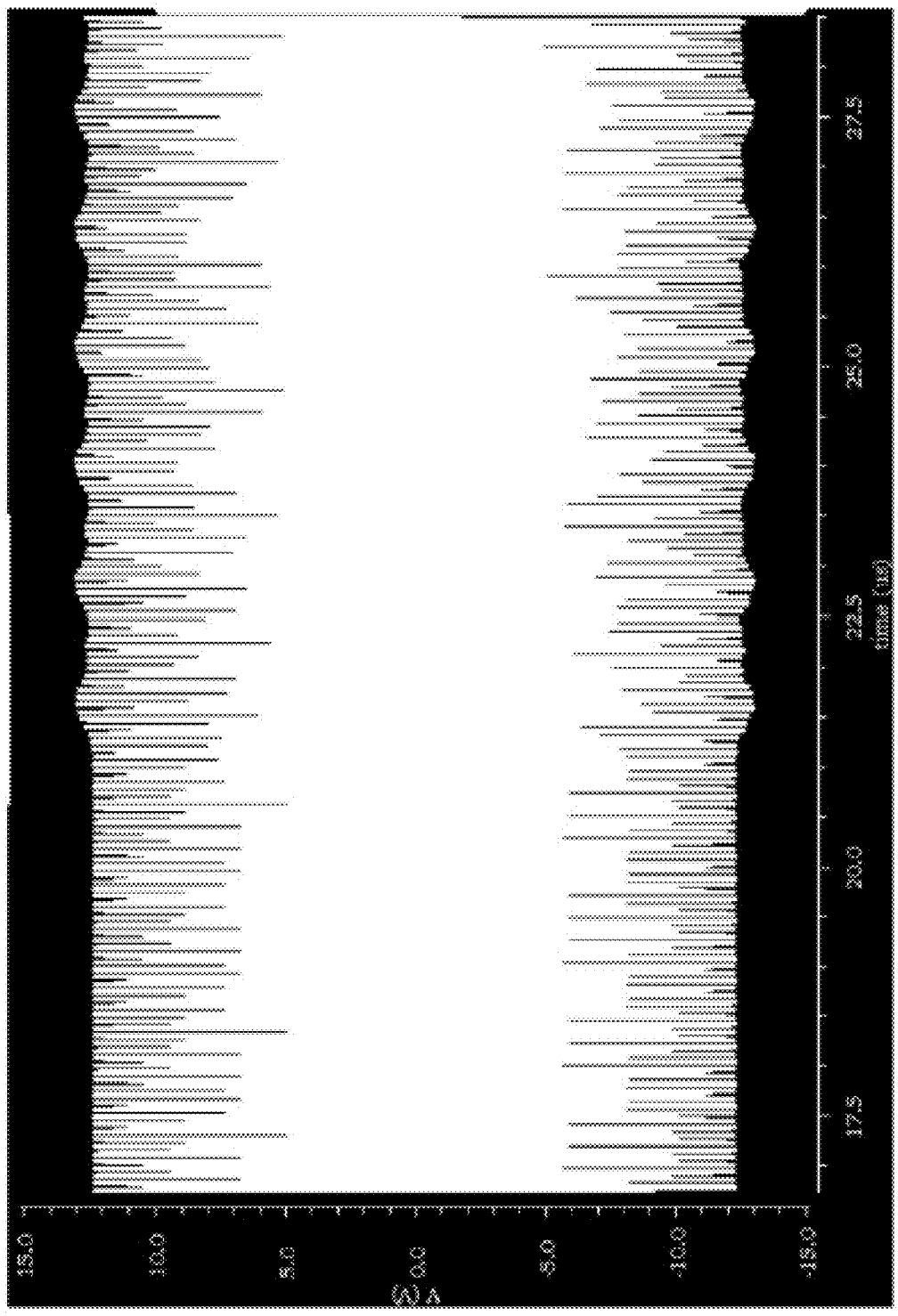

Phase relationship between $F_1$ and $F_2$ is important as misalignment of their phases may affect performance of load modulation. For example, when $F_1$ and $F_2$ are in-phase with each other (i.e. phase offset=0 degree), the amplitude of the combined waveforms $F_1$ and $F_2$ as detected by initiator device 110 is relative high. See FIG. 5(a). Similarly, when $F_1$ and $F_2$ are 180 degree out of phase with each other (i.e. phase offset=180 degree), the amplitude of the combined waveforms $F_1$ and $F_2$ as detected by initiator device 110 is also relative high. See FIG. 5(c). Conversely, when $F_1$ and $F_2$ are 90 degree out of phase with each other (i.e. phase offset=90 degree), the amplitude of the combined waveforms $F_1$ and $F_2$ as detected by initiator device 110 is relative low. See FIG. 5(b). Similarly, when $F_1$ and $F_2$ are 270 degree out of phase with each other (i.e. phase offset=270 degree), the amplitude of the combined waveforms $F_1$ and $F_2$ as detected by initiator device 110 is also relative low. See FIG. 5(d). Clearly, phase offset between $F_1$ and $F_2$ needs to be controlled properly to avoid "neutralizing" zones (phase offset near 90 and 270 degrees) which are undesirable. To provide more margin, phase offset of less than 45 degree is preferable.

Target device 130 as shown in FIG. 1 comprises antenna 140, matching network 150, frequency tracking module (FTM) 160, transmitter 170, clock extractor 180, and local clock generator 190. Target device 130 may also comprise other components not shown in FIG. 1. Antenna 140 can be a single inductive loop antenna. Matching network 150 may comprise capacitors and inductors, which together with antenna 140 form a resonant circuit. Transmitter 170 can be part of a transceiver module (not shown) in target device 130. Transmitter 170 comprises phase tracking module (PTM) 172, driver circuit 174, power amplifier 176, and other components not shown in the figure. Clock extractor 180 is coupled with matching network 150 to recover/extract clock information from $F_1$ detected by antenna 140. The recovered clock signal (EXT_CLK) produced by clock extractor 190 should be same phase and frequency as $F_1$. Local clock generator 190 can generate a reference clock signal (REF_CLK) at any suitable frequency. Frequency tracking module 160 can receive both REF_CLK and EXT_CLK, but only one clock signal can be selected at one time, and produce an output (FTM_CLK) to be fed into phase tracking module 172. Phase tracking module 172 receives FTM_CLK and EXT_CLK, and produce an output (PTM_CLK) which served as a carrier signal for load modulation of target's data by other modules in target device 130 to form a load modulated signal. Power amplifier 176 can amplify the load modulated signal which is then radiated to initiator device 110 by antenna 140.

Several embodiments of frequency tracking module 160 and phase tracking module 172 will be discussed below with reference to FIGS. 2, 3 and 4. In these embodiments, frequency tracking module 160 (i.e. 260, 360 or 460) and phase tracking module 172 (i.e. 272, 372 or 472) are configured as a dual loop structure that work together to prepare an output carrier signal with properly aligned phase and frequency for ALM transmission. Frequency tracking module 160 is used to synthesis a desired frequency (13.56 MHz) for the carrier signal based on an input clock signal (either REF_CLK or EXT_CLK). Phase tracking module 172 is used to align phase of the carrier signal with the initiator's clock signal (EXT_CLK).

The embodiment as shown in FIG. 2 is applicable to first strategy (S1) for ALM with asynchronous transmission. In this figure, frequency tracking module 260 comprises phase-frequency detector (PFD) 202, loop filter (LF) 204, voltage controlled oscillator (VCO) 206 and frequency divider (FD) 208, which are connected sequentially to form an analog phase-locked loop (PLL) system to perform frequency tracking operation to synthesis a desired frequency based on a reference clock signal (REF_CLK). PFD 202 has two inputs to receive REF_CLK from local clock generator 190 and a feedback signal (FB_CLK) from FD 208, and compare the phase and/or frequency of FB_CLK with REF_CLK. If FB_CLK and REF_CLK are not in phase and/or frequency, a control signal containing information of the phase and/or frequency offset between the two signals will be produced by PFD 202 and fed into LF 204. LF 204 performs a filtering operation on the received control signal from PFD 202 and produces a control voltage associated to the detected phase and/or frequency offset between FB_CLK and REF_CLK. LF 204 may comprise a charge pump and a low pass filter.

VCO 206 receives the control voltage from LF 204 and produces a VCO output with its phase/frequency adjusted based on the received control voltage. The VCO output is also served as the output of frequency tracking module 260 (namely FTM output or FTM_CLK). VCO 206 may be of the form of any suitable oscillator structure (e.g. ring oscillator, resonant oscillator, etc.) which can generate a clock signal at a high frequency, typically multiples of 13.56 MHz. FD 208 receives the VCO output and divides its frequency by a number (or dividing ratio) to alter frequency of the VCO output to a value to be equal or closer to frequency of REF_CLK. This number is changeable which can be an integer or non-integer so that a feedback signal (FB_CLK) at a desired frequency can be produced and fed into PFD 202 for detection of phase and/or frequency offset with REF_CLK.

The above described frequency tracking operation will continue to drive FB_CLK towards REF_CLK and eventually FB_CLK is adjusted to be in-phase with REF_CLK and their frequencies are equal or close to each other within an acceptable frequency accuracy. At this stage, VCO 206 is said at a locked state and FB_CLK is properly aligned with REF_CLK. In other words, a VCO output (also FTM_CLK) at a desired frequency has successfully been obtained.

VCO 206 may be configured to produce a plurality of FTM outputs with equally spaced phases by a phase difference. These FTM outputs are fed into phase tracking module 272 for phase alignment. Phase tracking module 272 comprises phase interpolation (PI) unit 252, phase sampler 254, and digital loop filter (DLF) 256, which are connected sequentially to form a feedback loop system (when switch 258 is closed) to perform phase tracking operation to track the best clock phase for the output carrier signal. PI unit 252 receives a first plurality of FTM outputs with equally spaced phases by a first phase difference from frequency tracking module 260, and interpolates them to form a larger second plurality of FTM outputs with equally spaced phase by a second phase difference. For example, interpolation of N clock phases to become 2N, 4N or 8N clock phases. This interpolation process can be accomplished by using arrays of phase interpolators within PI unit 252 and the second phase difference is associated to the resolution of PI unit 252. One of the second plurality of FTM outputs with a desired clock phase will be selected and output from PI unit 252 as a PI output to be fed into phase sampler 254. The PI output is also served as the output of phase tracking module 272 (namely PTM output or PTM_CLK). Typically, the resolution of PI unit 252 is up to 7 bits considering its power consumption and implementation cost.

Phase sampler 254 comprises two inputs to receive the PI output and the recovered clock signal (EXT_CLK), and compare phase of EXT_CLK with the PI output. If EXT_CLK and the PI output are not in phase, a digital signal containing information of the phase offset between the two signals will be produced by phase sampler 254 and fed into DLF 256. This clock phase comparison step is important as the phase of EXT_CLK may vary in time depending on $F_1$ generated by initiator device 120. Hence, the PI output with the closest phase to EXT_CLK has to be updated constantly in order to ensure proper ALM transmission. DLF 256 receives the digital signal from phase sampler 254 and performs a filtering operation on it to produce a digital control signal associated to the detected phase offset between EXT_CLK and the PI output. PI unit 254 receives the digital control signal from DLF 256 and selects one of the second plurality of FTM outputs to be output from the unit based on the received digital control signal such that the selected FTM output (i.e. PI output) has the closet clock phase to EXT_CLK among all the second plurality of FTM outputs. The above described phase tracking operation will continue until converges, in which PI output is properly aligned with EXT_CLK. At this stage, the PI output and EXT_CLK are in-phase or close to each other within an acceptable phase accuracy. Accordingly, PI unit 252 will continue to output the same PI output until it receives a new digital control signal from DLF 256 indicative of a significant phase offset is detected.

In FIG. 2, the PLL system of frequency tracking module 260 can continuously operate in a closed loop even during ALM transmission (i.e. no open/close loop transitions) as the frequency tracking is based on a local reference clock which is independent of the initiator's carrier signal. As such, it can avoid possible disturbances due to open/close loop transitions. On the other hand, the feedback loop of phase tracking module 272 is required to open during ALM transmission (switch 258 is open) as the phase tracking is based on the clock recovered from the initiator's carrier signal. Accordingly, DLF 256 will continue to update its output (digital control signal) in the same speed obtained when the feedback loop is closed (just before the loop is open).

The maximum data frame length supported by this embodiment may be checked. Considering PI unit 252 has 7 bits resolution and FTM output is 14 KHz away from 13.56 MHz, the equivalent frequency offset is reduced from 14 KHz to 0.109 KHz (i.e. $14000/2^7$). Accordingly, phase offset will exceed 45 degree within 15,550 clock cycles based on the below calculation:

$$\frac{45}{\left(\frac{13.56}{13.56-0.000109}-1\right)\times 360} = 15{,}550 \text{ cycles.}$$

This can be translated into about 15 bytes of data frame for 106 kbps. Generally, this embodiment is capable of supporting data frame size of 16 to 32 bytes (if frequency offset is lower than 14 KHz and/or phase offset is slightly above 45 degree), which is a relatively short data frame for ALM transmission. Therefore, this embodiment meets the restricted frame size condition for the first strategy (S1). However, this embodiment is not suitable for the second strategy (S2) as the phase tracking loop needs time to be trained and may not able to complete within 8 clock cycles in the first half of the subcarrier period as required for S2.

Another embodiment of dual loop structure is illustrated in FIG. 3, which is applicable to second strategy (S2) for ALM supporting both synchronous and asynchronous transmissions. In this embodiment, frequency tracking module 360 comprises PFD 302, LF 304, VCO 306 and FD 308, which are connected sequentially to form an analog PLL system to perform frequency tracking operation (when switch 310 is closed) to synthesis a desired frequency based on an input clock signal which is either a reference clock signal (REF_CLK) or a recovered clock signal (EXT_CLK). These PLL components are same as PFD 202, LF 204, VCO 206 and FD 208 and would function in the similar manner as described above in FIG. 2. Hence, for brevity, no further discussions for PFD 302, LF 304, VCO 306 and FD 308 here. However, in FIG. 3, frequency tracking module 360 further comprises multiplexer 312 connected to PFD 302 to allow for selecting an input clock signal from local clock generator 190 (for REF_CLK) or clock extractor 190 (for EXT_CLK). Only one input clock signal can be selected at one time. If REF_CLK is selected, switch 310 is not required to open and hence the PLL system can continuously operate in a closed loop even during ALM transmission (similar to FIG. 2). If EXT_CLK is selected, switch 310 is required to open to convert the PLL to an open loop during ALM transmission (only in the first half of the subcarrier period; second half of the subcarrier period remains closed). This also helps to restore the VCO drift during the open loop period.

Phase tracking module 372 comprises phase interpolation (PI) unit 352, time-to-digital converter (TDC) 354, and phase selection (PS) unit 356, which are connected to form a fast parallel digital system to perform phase tracking operation to track the best clock phase for the output carrier signal. PI unit 352 receives a first plurality of FTM outputs with equally spaced phases by a first phase difference from frequency tracking module 360, and interpolates them to form a larger second plurality of FTM outputs with equally spaced phase by a second phase difference, such as from N clock phases to become 2N, 4N or 8N clock phases. All the second plurality of FTM outputs are sent from PI unit 352 to TDC 354 and PS unit 356 concurrently. TDC 354 comprises two inputs to receive the second plurality of FTM outputs concurrently and the recovered clock signal (EXT_CLK), and compares clock phase of EXT_CLK with the second plurality of FTM outputs. If EXT_CLK is not in phase with the second plurality of FTM outputs, a digital control signal containing information of the phase relationship between the EXT_REF and the second plurality of FTM outputs will be produced by TDC 354 and fed into PS unit 356. PS unit 356 comprises two inputs to receive the second plurality of FTM outputs from PI unit 352 concurrently and the digital control signal from TDC 354, and select one of the second plurality of FTM outputs to be output from PS unit 356 based on the received digital control signal such that the selected FTM output (i.e. PS output) has the closet clock phase to EXT_CLK among all the second plurality of FTM outputs. The PS output is also served as the output of phase tracking module 372 (namely PTM output or PTM_CLK), which is used to load modulating data of target device 130.

As an example, consider PI unit 352 with 32 clock-phases outputs. These 32 clock-phases outputs are fed into TDC 354 and PS unit 356 concurrently. In TDC 354, the 32 clock-phases inputs are sampled with EXT_CLK and converted into 32-bit one-hot code. This code is then fed into a decoder (not shown) where it will be decoded into 5-bit binary code. This 5-bit binary code will be fed into PS unit 356, where one out of the 32 clock-phases outputs will be selected to be output from PS unit 356. This selected output has the closest phase to EXT_CLK among the 32 clock-phases outputs.

Benefiting from the fast parallel digital processing of TDC 354, phase tracking operation can be accomplished within a few clock cycles, particularly within 8 clock cycles in the first half of the subcarrier period. Therefore, this embodiment is suitable for the second strategy (S2) of phase synchronization. Once the phase is selected, even if its frequency is away from 13.56 MHz by the maximum of 14 KHz, the worst phase offset within 10 clock cycles (i.e. 8 cycles for half subcarrier period+2 cycles for the margin) is 15 degree only, based on the below calculation:

$$\left(\frac{13.56}{13.56-0.014}-1\right)\times 36 \times 10 + \frac{360}{32} = 15 \text{ degree.}$$

In light of the above, this embodiment provides more than enough margin for ALM transmission. However, for an analog PLL system (FIGS. 2 and 3) where the phase/frequency of the VCO output is adjusted continuously by an analog control voltage, the PLL system may be disturbed heavily due to the open/close loop transitions. Thus, to address this issue, an all-digital PLL system is used to replace the analog PLL system, as illustrated in FIG. 4.

In FIG. 4, frequency tracking module 460 comprises digital-to-time converter (TDC) 402, digital loop filter (DLF) 404, digitally controlled oscillator (DCO) 406, and frequency divider (FD) 408, which are connected sequentially to form an all-digital PLL system to perform frequency tracking operation to synthesis a desired frequency based on an input clock signal. Frequency tracking module 460 further comprises multiplexer 412 connected to TDC 402 for selecting the input clock signal which is either REF_CLK or EXT_CLK. TDC 402 receives an input clock signal from multiplexer 412 and a feedback signal (FB_CLK) from FD 408, and compares phase of FB_CLK with the input clock signal. If FB_CLK and the input clock signal are not in phase, a digital signal containing information of the phase offset between the two signals will be produced by TDC 402 and fed into DLF 404. DLF 404 performs a filtering operation on the received digital signal from TDC 402 and produces a digital control signal associated to the detected phase offset between FB_CLK and the input clock signal.

DCO 406 receives the digital control signal from DLF 404 and produces a DCO output with its phase adjusted based on the received digital control signal. The DCO output is also served as an output of frequency tracking module 460 (namely FTM output or FTM_CLK). FD 408 receives the DCO output and divides its frequency by a number (or dividing ratio) to alter frequency of the DCO output to a value to be equal or closer to frequency of the input clock signal. This number is changeable and can be an integer or non-integer so that a feedback signal (FB_CLK) at a desired frequency can be produced and fed into TDC 402 for detection of phase offset with the input clock signal. This all-digital PLL is free or almost free from the undesirable disturbances due to open/close loop transitions. Switch 410 is controlled to open and close at precise timing depending on the type of transmission or input clock signal being selected. If REF_CLK is selected, no opening of switch 410 is required and the PLL will always operate in a closed loop. If EXT_CLK is selected, switch 410 is required to open during ALM transmission (only in the first half of the subcarrier period). When DCO 406 is at locked stage, the FTM output is at a desired frequency based on the input clock signal.

Phase tracking module 472 comprises PI unit 452, TDC 454, and PS unit 456, which are connected to form a fast parallel digital system to perform phase tracking operation to track the best clock phase for the output carrier signal. These components are same as PI unit 352, TDC 354 and PS unit 356 and would function in the similar manner as described above in FIG. 3. Hence, for brevity, no further discussions for PI unit 452, TDC 454, and PS unit 456 here.

Figure 6:
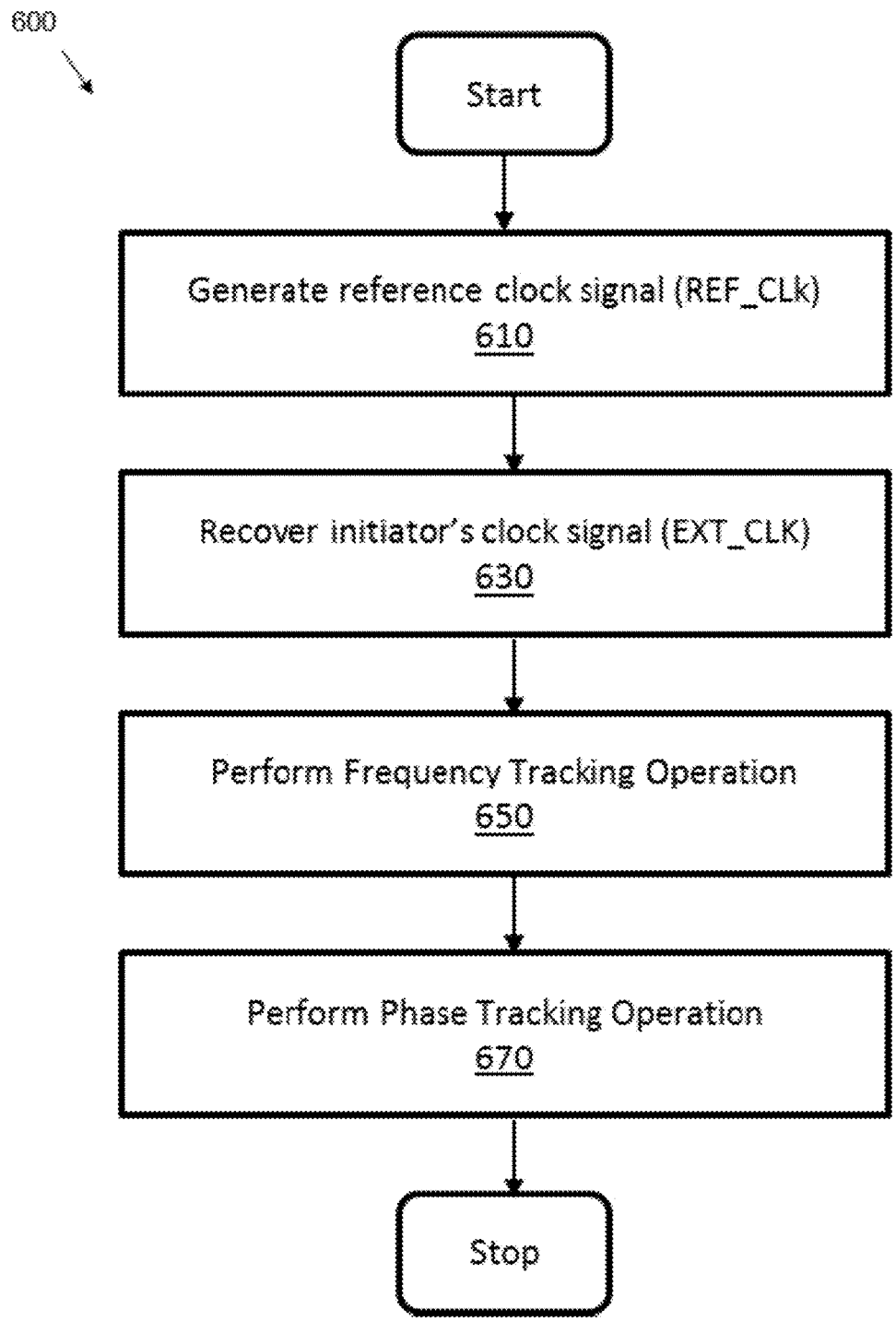
FIG. 6 illustrating an overview of a method for preparing a carrier signal for ALM transmission in accordance with an embodiment of this invention.

FIG. 6 illustrates an overview of a method 600 for preparing a carrier signal for ALM transmission by NFC device 130 as described above. Method 600 begins with step 610 to generate a reference clock signal (REF_CLK) by local clock generator 190 in NFC device 130. In step 630, method 600 recovers a clock signal (EXT_CLK) from $F_1$ generated by initiator device 110 by clock extractor 180 in NFC device 130. In step 650, a frequency tracking operation is performed by a frequency tracking module in NFC device 130 to produce an output at a desired frequency. In step 670, a phase tracking operation is performed by a phase tracking module in NFC device 130 to produce an output with properly aligned phase and frequency for use in load modulating data of NFC device 130 to form load modulated signal to be actively transmitted to initiator device 110.

In step 650, the frequency tracking operation may be performed by an analog PLL system or an all-digital PLL system. The analog PLL system comprises PFD (202, 302), LP (204, 304), VCO (206, 306), and FD (208, 308) in NFC device 130, as described above in FIGS. 2 and 3. The all-digital PLL system comprises TDC 402, DLF 404, DCO 406, and FD 408 in NFC device 130, as described above in FIG. 4. Step 650 further comprises the following steps:

receiving an input clock signal (REF_CLK or EXT_CLK) through a multiplexer (312, 412). The input clock signal may also be received directly without a multiplexer;

comparing phase and/or frequency of a PLL feedback signal with the input clock signal and producing a control signal in response to an offset in phase and/or frequency between the feedback signal and the input clock signal. This step may be performed by the PFD or the TDC;

performing a filtering operation on the control signal and producing a control value associated to the phase and/or frequency offset between the feedback signal and the input clock signal. The step may be performed by the LP or the DLF.

adjusting phase and/or frequency of the VCO or DCO based on the control value and producing a VCO/DCO output with adjusted phase and/or frequency, which served as the output of the frequency tracking module (FTM output or FTM_CLK); and dividing frequency of the VCO/DCO output by a number which is changeable to any suitable value to alter frequency of the VCO/DCO output to be equal or closer to frequency of the input clock signal and producing a new feedback signal. This step is performed by the FD.

The above frequency tracking steps will continue until a feedback signal is aligned with the input clock signal, in which the feedback signal and the input clock signal are in-phase and their frequencies are equal or close to each other within an acceptable frequency accuracy.

In step 670, the phase tracking operation may be performed by a feedback loop system comprises PI unit 352, phase sampler 354 and DLF 356 in NFC device 130 as described above in FIG. 2, or a parallel digital system comprises PI unit (352, 452), TDC (354,454) and PS unit (356,456) in the NFC device 130 as described above in FIGS. 3 and 4. For the feedback loop system comprised of the PI unit, phase sampler and DLF, step 670 further comprises the following steps:

receiving a first plurality of FTM outputs from the frequency tracking module and interpolating the first plurality of FTM outputs to form a larger second plurality of FTM outputs. This step is performed by the PI unit;

selecting one of the second plurality of FTM outputs to be output from the PI unit as an PI output based on a digital control signal from the DLF such that the PI output has the closest phase to the recovered clock signal (EXT_CLK) among all the second plurality of FTM outputs. The PI output is served as the PTM output;

comparing phase of EXT_CLK with the PI output and producing a digital signal in response to a phase offset between EXT_CLK and the PI output. This step is performed by the phase sampler; and performing a filtering operation on the digital signal and producing a digital control signal associated to the phase offset between EXT_CLK and the PI output and to be fed into the PI unit. This step is performed by the DLP.

The above phase tracking steps will continue until the PI output is aligned with EXT_CLK, in which the PI output and EXT_CLK are in-phase or close to each other within an acceptable phase accuracy.

For the parallel digital system comprised of the PI unit, TDC and PS unit, step 670 further comprises the following steps:

receiving a first plurality of FTM outputs from the frequency tracking module and interpolating the first plurality of FTM outputs to form a larger second plurality of FTM. This step is performed by the PI unit;

sending all the second plurality of FTM outputs to the TDC and the PS unit concurrently;

comparing phase of EXT_CLK with the second plurality of FTM outputs and producing a digital control signal associated to phase relationship between EXT_CLK and the second plurality of FTM outputs. This step is performed by the TDC; and selecting one of the second plurality of FTM outputs to be output from the PS unit as a PS output based on the digital control signal from the TDC such that the PS output has the closest phase to EXT_CLK among all the second plurality of FTM outputs. The PS output is served as the PTM output.

While the present invention has been described in certain aspects and with reference to specific embodiments, it should be understood by those skilled in the art that various modifications and/or variations may be made to the invention without departing from the scope of the invention as broadly described and as set forth in the following claims. Thus, the embodiments should be considered in all respects as illustrative and not restrictive.

What is claimed is:

1. A near field communication (NFC) device for use in preparing a carrier signal for active load modulation transmission, the NFC device comprising:
    a local clock generator configured to generate a reference clock signal;
    a clock extractor configured to recover a clock signal generated by an NFC initiator device;
    a frequency tracking module (FTM) configured to perform a frequency tracking operation based on an input clock signal to produce a FTM output with its frequency aligned with the input clock signal wherein the input clock signal is the reference clock signal or the recovered clock signal, wherein the FTM is an analog phase-locked loop (PLL) system, comprising:
        a phase-frequency detector (PFD) configured to receive the input clock signal and a feedback signal from a frequency divider (FD), compare phase and/or frequency of the feedback signal with the input clock signal, and produce a control signal in response to an offset in phase and/or frequency between the feedback signal and the input clock signal;
        a loop filter (LF) configured to receive the control signal from the PFD, perform a filtering operation on the control signal, and produce a control value associated to the offset in phase and/or frequency between the feedback signal and the input clock signal;
        a voltage controlled oscillator (VCO) configured to receive the control value from the LF and produce a VCO output with its phase and/or frequency adjusted based on the control value wherein the VCO output is served as the FTM output; and
        the FD is configured to receive the VCO output from the VCO, divide frequency of the VCO output by a number which is changeable to any suitable value to alter frequency of the VCO output to be equal or closer to frequency of the input clock signal, and produce a feedback signal to be fed into the PFD;
        wherein the feedback signal is aligned with the input clock signal when the feedback signal and the input clock signal are in-phase and their frequencies are equal or close to each other within an acceptable frequency accuracy; and
    a phase tracker configured to perform a phase tracking operation on the FTM output based on the recovered clock signal to produce a phase tracker output with its phase aligned with the recovered clock signal;
    wherein the phase tracker output at a desired frequency and phase is served as the carrier signal for use in load modulating data of the NFC device to form a load modulated signal to be actively transmitted to the NFC initiator device.

2. The NFC device of claim 1, wherein the FTM further comprising:
    a multiplexer configured to select the input clock signal which is either the reference clock signal from the local clock generator or the recovered clock signal from the clock extractor.

3. The NFC device of claim 1, wherein the input clock signal is the reference clock signal which is independent of the clock signal generated by the initiator device, the PLL system of the FTM is able to operate continuously in a closed loop even during active load modulation transmission.

4. The NFC device of claim 1, wherein the input clock signal is the recovered clock signal which is dependent on the clock signal generated by the initiator device, the PLL system of the FTM is required to convert to an open loop during active load modulation transmission.

5. The NFC device of claim 1, wherein the local clock generator is a temperature-compensated crystal oscillator.

6. The NFC device of claim 1, wherein the phase tracker comprises:
    a phase interpolator, a phase sampler, and a digital loop filter (DLF) connected sequentially to form a feedback loop system to perform the phase tracking operation to track a desired clock phase based on the recovered clock signal;
    wherein the phase sampler comprises a circuitry configured to receive the recovered clock signal and a phase interpolation (PI) output from the phase interpolator, compare phase of the recovered clock signal with the PI output, and produce a digital signal in response to a phase offset between the recovered clock signal and the PI output;
    wherein the DLF comprises a circuitry configured to receive the digital signal from the phase sampler, perform a filtering operation on the digital signal, and produce a digital control signal associated to the phase offset between the recovered clock signal and the PI output;
    wherein the phase interpolator comprises a circuitry configured to receive a first plurality of FTM outputs with equally spaced phases by a first phase difference from the FTM, interpolate the first plurality of FTM outputs to form a second plurality of FTM outputs with equally spaced phases by a second phase difference wherein the second plurality of FTM outputs is greater than the first plurality of FTM outputs, and select one of the second plurality of FTM outputs to be output from the phase interpolator as an PI output based on the digital control signal received from the DLF such that the PI output has the closest phase to the recovered clock signal among the second plurality of FTM outputs wherein the PI output is served as the phase tracker output and fed into the phase sampler;
    wherein the PI output is aligned with the recovered clock signal when the PI output and the recovered clock signal are in-phase or close to each other within an acceptable phase accuracy.

7. The NFC device of claim 1, wherein the phase tracker comprises:
    a phase interpolator, a time-to-digital converter (TDC), and a phase selector connected to form a system to perform the phase tracking operation to track a desired clock phase based on the recovered clock signal;
    wherein the phase interpolator comprises a circuitry configured to receive a first plurality of FTM outputs with equally spaced phases by a first phase difference from the FTM, interpolate the first plurality of FTM outputs to form a second plurality of FTM outputs with equally spaced phases by a second phase difference wherein the second plurality of FTM outputs is greater than the first plurality of FTM outputs, and send the second plurality of FTM outputs to the TDC and the phase selector concurrently;

wherein the TDC comprises a circuitry configured to receive the recovered clock signal and the second plurality of FTM outputs from the phase interpolator, compare phase of the recovered clock signal with the second plurality of FTM outputs, and produce a digital control signal associated to phase relationship between the recovered clock signal and the second plurality of FTM outputs;

wherein the phase selector configured to receive the digital control signal from the TDC and the second plurality of FTM outputs from the phase interpolator, and select one of the second plurality of FTM outputs to be output from the phase selector as a phase selection (PS) output based on the digital control signal such that the PS output has the closest phase to the recovered clock signal among the second plurality of FTM outputs wherein the PS output is served as the phase tracker output;

wherein the PS output is aligned with the recovered clock signal when the PS output and the recovered clock signal are in-phase or close to each other within an acceptable phase accuracy.

8. The NFC device of claim 6, wherein the feedback loop system of the phase tracker is converted to an open loop during active load modulation transmission.

9. A method for preparing a carrier signal for active load modulation transmission by a near field communication (NFC) device, the method comprising:

generating a reference clock signal by a local clock generator in the NFC device;

recovering a clock signal generated by an NFC initiator device by a clock extractor in the NFC device;

performing a frequency tracking operation based on an input clock signal by a frequency tracking module (FTM) in the NFC device to produce a FTM output with its frequency aligned with the input clock signal wherein the input clock signal is the reference clock signal or the recovered clock signal, wherein the FTM is an analog phase-locked loop (PLL) system comprising: a phase-frequency detector (PFD), a loop filter (LF), a voltage controlled oscillator (VCO), and a frequency divider (FD), and the step of performing the frequency tracking operation to synthesis a desired frequency comprising:

receiving an input clock signal which is the reference clock signal from the local clock generator or the recovered clock signal from the clock extractor;

comparing phase and/or frequency of a feedback signal from the FD with the input clock signal and producing a control signal in response to an offset in phase and/or frequency between the feedback signal and the input clock signal by the PFD;

performing a filtering operation on the control signal from the PFD and producing a control value associated to the offset in phase and/or frequency between the feedback signal and the input clock signal by the LF;

adjusting phase and/or frequency of the VCO based on the control value from the LF and producing a VCO output with adjusted phase and/or frequency wherein the VCO output is served as the FTM output; and dividing frequency of the VCO output by a number which is changeable to any suitable value to alter frequency of the VCO output to be equal or closer to frequency of the input clock signal and producing a feedback signal to be fed into the PFD by the FD;

wherein the feedback signal is aligned with the input clock signal when the feedback signal and the input clock signal are in-phase and their frequencies are equal or close to each other within an acceptable frequency accuracy; and performing a phase tracking operation on the FTM output based on the recovered clock signal by a phase tracker in the NFC device to produce a phase tracker output with its phase aligned with the recovered clock signal;

wherein the phase tracker output at a desired frequency and phase is served as the carrier signal for use in load modulating data of the NFC device to form a load modulated signal to be actively transmitted to the NFC initiator device.

10. The method claim 9, wherein the step of receiving the input clock signal comprises selecting the input clock signal through a multiplexer in the NFC device.

11. The method claim 9, wherein the input clock signal is the reference clock signal which is independent of the clock signal generated by the initiator device, the step of forming the PLL system comprises forming a closed loop that operates continuously even during active load modulation transmission.

12. The method claim 9, wherein the input clock signal is the recovered clock signal which is dependent of the clock signal generated by the initiator device, the step of forming the PLL system comprises forming an open loop during active loop modulation transmission.

13. The method of claim 9, wherein the phase tracker is a feedback loop system comprising a phase interpolator, a phase sampler, and a digital loop filter (DLF), and wherein the step of performing the phase tracking operation to track a desired clock phase comprising:

receiving a first plurality of FTM outputs with equally spaced phases by a first phase difference from the FTM and interpolating the first plurality of FTM outputs to form a second plurality of FTM outputs with equally spaced phases by a second phase difference by the phase interpolator wherein the second plurality of FTM outputs is greater than the first plurality of FTM outputs;

selecting one of the second plurality of FTM outputs to be output from the phase interpolator as an phase interpolation (PI) output based on a digital control signal from the DLF such that the PI output has the closest phase to the recovered clock signal among the second plurality of FTM outputs wherein the PI output is served as the phase tracker output;

comparing phase of the recovered clock signal with the PI output and producing a digital signal in response to a phase offset between the recovered clock signal and the PI output by the phase sampler; and performing a filtering operation on the digital signal from the phase sampler and producing a digital control signal associated to the phase offset between the recovered clock signal and the PI output by the DLF wherein the digital control signal is fed into the phase interpolator;

wherein the PI output is aligned with the recovered clock signal when the PI output and the recovered clock signal are in-phase or close to each other within an acceptable phase accuracy.

14. The method of claim 9, wherein the phase tracker is a system comprising a phase interpolator, a time-to-digital converter (TDC), and a selector, and wherein the step of performing the phase tracking operation to track a desired clock phase comprising:
   receiving a first plurality of FTM outputs with equally spaced phases by a first phase difference from the FTM and interpolating the first plurality of FTM outputs to form a second plurality of FTM outputs with equally spaced phases by a second phase difference by the phase interpolator wherein the second plurality of FTM outputs is greater than the first plurality of FTM outputs;
   sending the second plurality of FTM outputs to the TDC and the phase selector concurrently;
   comparing phase of the recovered clock signal with the second plurality of FTM outputs received from the phase interpolator and producing a digital control signal associated to phase relationship between the recovered clock signal and the second plurality of FTM outputs by the TDC; and
   selecting one of the second plurality of FTM outputs received from the phase interpolator to be output from the phase selector as a PS output based on the digital control signal from the TDC such that the PS output has the closest phase to the recovered clock signal among the second plurality of FTM outputs wherein the PS output is served as the phase tracker output;
   wherein the PS output is aligned with the recovered clock signal when the PS output and the recovered clock signal are in-phase or close to each other within an acceptable phase accuracy.

15. The method of claim 13, wherein the step of forming the feedback loop system comprises forming an open loop during active load modulation transmission.

16. A near field communication (NFC) device for use in preparing a carrier signal for active load modulation transmission, the NFC device comprising:
   a local clock generator configured to generate a reference clock signal;
   a clock extractor configured to recover a clock signal generated by an NFC initiator device;
   a frequency tracking module (FTM) configured to perform a frequency tracking operation based on an input clock signal to produce a FTM output with its frequency aligned with the input clock signal wherein the input clock signal is the reference clock signal or the recovered clock signal, wherein the FTM is an all-digital phase-locked loop (PLL) system, comprising:
      a time-to-digital converter (TDC) configured to receive the input clock signal and a feedback signal from a frequency divider (FD), compare phase of the feedback signal with the input clock signal, and produce a digital signal in response to a phase offset between the feedback signal and the input clock signal;
      a digital loop filter (DLF) configured to receive the digital signal from the TDC, perform a filtering operation on the received digital signal, and produce a digital control signal associated to the phase offset between the feedback signal and the input clock signal;
      a digitally controlled oscillator (DCO) configured to receive the digital control signal from the DLF and produce a DCO output with its phase adjusted based on the digital control signal wherein the DCO output is served as the FTM output; and
      the FD is configured to receive the DCO output, divide frequency of the DCO output by a number which is changeable to any suitable value to alter frequency of the DCO output to be equal or closer to frequency of the input clock signal, and produce a feedback signal to be fed into the TDC;
      wherein the feedback signal is aligned with the input clock signal when the feedback signal and the input clock signal are in-phase and their frequencies are equal or close to each other within an acceptable frequency accuracy; and
   a phase tracker comprises a circuitry configured to perform a phase tracking operation on the FTM output based on the recovered clock signal to produce a phase tracker output with its phase aligned with the recovered clock signal;
   wherein the phase tracker output at a desired frequency and phase is served as the carrier signal for use in load modulating data of the NFC device to form a load modulated signal to be actively transmitted to the NFC initiator device.

17. The NFC device of claim 16, wherein the FTM further comprising:
   a multiplexer configured to select the input clock signal which is either the reference clock signal from the local clock generator or the recovered clock signal from the clock extractor.

18. The NFC device of claim 16, wherein the input clock signal is the reference clock signal which is independent of the clock signal generated by the initiator device, the PLL system of the FTM is able to operate continuously in a closed loop even during active load modulation transmission.

19. The NFC device of claim 16, wherein the input clock signal is the recovered clock signal which is dependent on the clock signal generated by the initiator device, the PLL system of the FTM is required to convert to an open loop during active load modulation transmission.

20. The NFC device of claim 16, wherein the phase tracker comprises:
   a phase interpolator, a phase sampler, and a digital loop filter (DLF) connected sequentially to form a feedback loop system to perform the phase tracking operation to track a desired clock phase based on the recovered clock signal;
   wherein the phase sampler comprises a circuitry configured to receive the recovered clock signal and a phase interpolation (PI) output from the phase interpolator, compare phase of the recovered clock signal with the PI output, and produce a digital signal in response to a phase offset between the recovered clock signal and the PI output;
   wherein the DLF comprises a circuitry configured to receive the digital signal from the phase sampler, perform a filtering operation on the digital signal, and produce a digital control signal associated to the phase offset between the recovered clock signal and the PI output;
   wherein the phase interpolator comprises a circuitry configured to receive a first plurality of FTM outputs with equally spaced phases by a first phase difference from the FTM, interpolate the first plurality of FTM outputs to form a second plurality of FTM outputs with equally spaced phases by a second phase difference wherein the second plurality of FTM outputs is greater than the first plurality of FTM outputs, and select one of the second plurality of FTM outputs to be output from the phase interpolator as an PI output based on the digital control signal received from the DLF such that the PI output has the closest phase to the recovered clock signal among the second plurality of FTM outputs wherein the PI output is served as the phase tracker output and fed into the phase sampler;

wherein the PI output is aligned with the recovered clock signal when the PI output and the recovered clock signal are in-phase or close to each other within an acceptable phase accuracy.

21. The NFC device of claim 16, wherein the phase tracker comprises:

a phase interpolator, a time-to-digital converter (TDC), and a phase selector connected to form a system to perform the phase tracking operation to track a desired clock phase based on the recovered clock signal;

wherein the phase interpolator comprises a circuitry configured to receive a first plurality of FTM outputs with equally spaced phases by a first phase difference from the FTM, interpolate the first plurality of FTM outputs to form a second plurality of FTM outputs with equally spaced phases by a second phase difference wherein the second plurality of FTM outputs is greater than the first plurality of FTM outputs, and send the second plurality of FTM outputs to the TDC and the phase selector concurrently;

wherein the TDC comprises a circuitry configured to receive the recovered clock signal and the second plurality of FTM outputs from the phase interpolator, compare phase of the recovered clock signal with the second plurality of FTM outputs, and produce a digital control signal associated to phase relationship between the recovered clock signal and the second plurality of FTM outputs;

wherein the phase selector configured to receive the digital control signal from the TDC and the second plurality of FTM outputs from the phase interpolator, and select one of the second plurality of FTM outputs to be output from the phase selector as a phase selection (PS) output based on the digital control signal such that the PS output has the closest phase to the recovered clock signal among the second plurality of FTM outputs wherein the PS output is served as the phase tracker output;

wherein the PS output is aligned with the recovered clock signal when the PS output and the recovered clock signal are in-phase or close to each other within an acceptable phase accuracy.

22. The NFC device of claim 20, wherein the feedback loop system of the phase tracker is converted to an open loop during active load modulation transmission.

23. A method for preparing a carrier signal for active load modulation transmission by a near field communication (NFC) device, the method comprising:

generating a reference clock signal by a local clock generator in the NFC device;

recovering a clock signal generated by an NFC initiator device by a clock extractor in the NFC device;

performing a frequency tracking operation based on an input clock signal by a frequency tracking module (FTM) in the NFC device to produce a FTM output with its frequency aligned with the input clock signal wherein the input clock signal is the reference clock signal or the recovered clock signal, wherein the FTM is an all-digital phase-locked loop (PLL) system comprising: a time-to-digital converter (TDC), a digital loop filter (DLF), a digitally controlled oscillator (DCO), and a frequency divider (FD), and the step of performing the frequency tracking operation to synthesis a desired frequency comprising:

receiving an input clock signal which is the reference clock signal from the local clock generator or the recovered clock signal from the clock extractor;

comparing phase of a feedback signal from the FD with the input clock signal and producing a digital signal in response to a phase offset between the feedback signal and the input clock signal by the TDC, performing a filtering operation on the digital signal from the TDC and producing a digital control signal associated to the phase offset between the feedback signal and the input clock signal by the DLF;

adjusting phase of the DCO based on the digital control signal from the DLF and producing a DCO output with adjusted phase wherein the DCO output is served as the FTM output; and dividing frequency of the DCO output by a number which is changeable to any suitable value to alter frequency of the DCO output to be equal or closer to frequency of the input clock signal and producing a feedback signal to be fed into the TDC by the FD;

wherein the feedback signal is aligned with the input clock signal when the feedback signal and the input clock signal are in-phase and their frequencies are equal or close to each other within an acceptable frequency accuracy; and performing a phase tracking operation on the FTM output based on the recovered clock signal by a phase tracker in the NFC device to produce a phase tracker output with its phase aligned with the recovered clock signal;

wherein the phase tracker output at a desired frequency and phase is served as the carrier signal for use in load modulating data of the NFC device to form a load modulated signal to be actively transmitted to the NFC initiator device.

\* \* \* \* \*